United States Patent
Unal et al.

(10) Patent No.: US 7,831,078 B2
(45) Date of Patent: Nov. 9, 2010

(54) SYSTEM AND METHOD FOR STATISTICAL SHAPE MODEL BASED SEGMENTATION OF INTRAVASCULAR ULTRASOUND AND OPTICAL COHERENCE TOMOGRAPHY IMAGES

(75) Inventors: Gozde Unal, Plainsboro, NJ (US); Susann Bucher, Kerns (CH); Gregory G. Slabaugh, Princeton, NJ (US); Tong Fang, Morganville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 782 days.

(21) Appl. No.: 11/779,413

(22) Filed: Jul. 18, 2007

(65) Prior Publication Data
US 2008/0075375 A1    Mar. 27, 2008

Related U.S. Application Data

(60) Provisional application No. 60/820,139, filed on Jul. 24, 2006.

(51) Int. Cl.
*G06K 9/00* (2006.01)

(52) U.S. Cl. .............................. 382/128; 128/922; 378/4

(58) Field of Classification Search ................. 382/100, 382/128, 129, 130, 131, 132, 181, 190, 195; 128/922; 378/4–27
See application file for complete search history.

(56) References Cited

U.S. PATENT DOCUMENTS

| | | | | |
|---|---|---|---|---|
| 5,761,334 | A | * | 6/1998 | Nakajima et al. ........... 382/132 |
| 6,839,457 | B1 | * | 1/2005 | Azuma et al. ............... 382/131 |
| 7,260,250 | B2 | * | 8/2007 | Summers et al. ............ 382/128 |
| 2005/0113680 | A1 | * | 5/2005 | Ikeda et al. .................. 600/425 |
| 2007/0269086 | A1 | * | 11/2007 | Kerwin et al. ............... 382/128 |
| 2008/0075375 | A1 | * | 3/2008 | Unal et al. ................... 382/243 |

* cited by examiner

*Primary Examiner* — Anand Bhatnagar

(57) ABSTRACT

A method for segmenting intravascular images includes acquiring a series of digitized images acquired from inside a vessel, each said image comprising a plurality of intensities corresponding to a 2-dimensional grid of pixels, providing a precomputed set of shapes for modeling contours of vessel wall boundaries, wherein a contour can be expressed as a sum of a mean shape and a inner product of shape modes and shape weights, initializing a boundary contour for one of said set of images, initializing said shape weights by projecting a contour into said shape modes, updating said shape weights from differential equations of said shape weights, and computing a contour by summing said mean shape and said inner product of shape modes and updated shape weights.

34 Claims, 11 Drawing Sheets

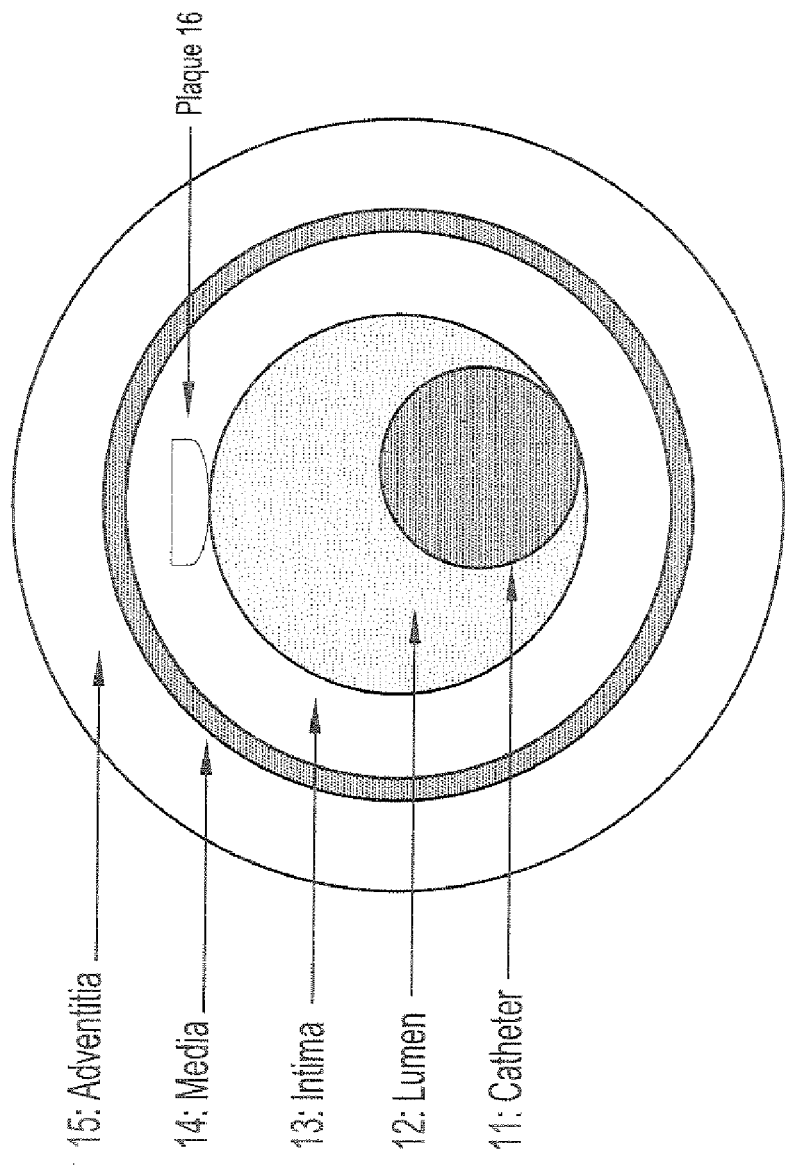

Luminal mean shape with weight variations for the first four modes.

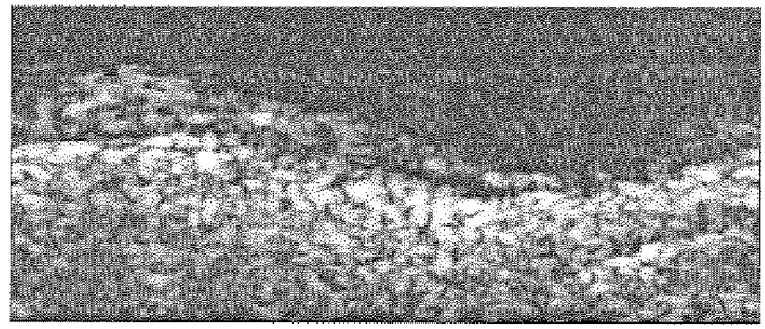
The original intensity image
(a)
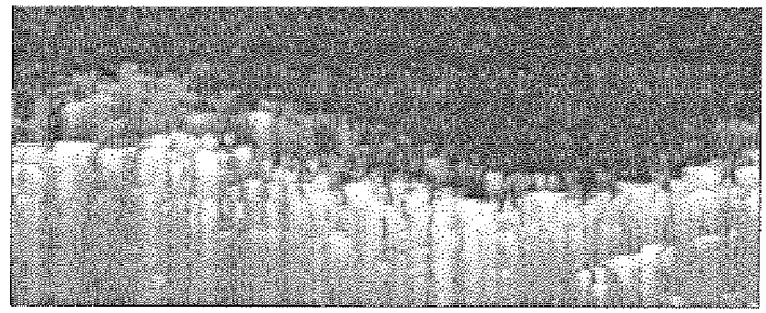
The modified intensity image
(b)
FIG. 5

SYSTEM AND METHOD FOR STATISTICAL SHAPE MODEL BASED SEGMENTATION OF INTRAVASCULAR ULTRASOUND AND OPTICAL COHERENCE TOMOGRAPHY IMAGES

CROSS REFERENCE TO RELATED UNITED STATES APPLICATIONS

This application claims priority from "Shape-driven Segmentation of Intravascular Ultrasound and Optical Coherence Tomography Images", U.S. Provisional Application No. 60/820,139 of Unal, et al., filed Jul. 24, 2006, the contents of which are herein incorporated by reference.

TECHNICAL FIELD

This disclosure is directed to the segmentation of arterial wall boundaries from intravascular images.

DISCUSSION OF THE RELATED ART

Intravascular ultrasound (IVUS) and optical coherence tomography (OCT) allows real time tomographic assessment of the arterial wall, which is useful for studying vascular wall architecture for diagnosis and assessment of the progression of the cardiovascular diseases. Atherosclerosis is a disease affecting arterial blood vessels, commonly referred to as a "hardening" of the arteries. It is a chronic inflammatory response in the walls of arteries, in large part due to the formation of multiple plaques within the arteries. Arteriosclerosis is a general term describing any hardening and loss of elasticity of medium or large arteries, while atherosclerosis is a hardening of an artery specifically due to an atheromatous plaque. Therefore, atherosclerosis is a form of arteriosclerosis. The disruption of an atherosclerotic plaque is considered to be the most frequent cause of heart attack and sudden cardiac death. Studying vulnerable plaques constitutes a major research area in the field of clinical and medical imaging. In order to track progression and regression during therapy of the arteriosclerosis, the luminal and media/adventitial arterial wall is extracted and the plaque area is identified in the region between these two borders.

A schema of the artery wall and catheter can be seen in FIG. 1. The black area 11 in the middle of the image shows the position of the catheter that acquires the IVUS image. The lumen 12 is the interior of the vessel, through which the blood flows. The intima 13 is the innermost layer of an artery. It is made up of one layer of endothelial cells and is supported by an internal elastic intima. The endothelial cells are in direct contact with the blood flow. It is a fine, transparent, colorless structure that is highly elastic. The media 14 is the middle layer of an artery. It is made up of smooth muscle cells and elastic tissue. The adventitia 15 is the outermost layer of the blood vessel, surrounding the media. It is mainly composed of collagen. Plaque 16 is shown attached to the intima 13.

Manual segmentation and processing is tedious, time-consuming, and susceptible to intra- and inter-observer variability. Due to the high number of images in a typical IVUS or OCT pullback, in the order of hundreds, automated segmentation of the arterial contours is an essential task.

Numerous approaches have been used to (semi-)automatically detect regions of interest in IVUS images. Most reported successful approaches are based on contour detection using a minimization of a cost function of the boundary contours or deformable models. Various optimization algorithms are applied. One approach is graph searching in which prior knowledge of the expected IVUS pattern is incorporated. Other approaches are based on active contours, probabilistic segmentation using elliptic templates, active contours through a neighborhood search and statistical distribution of blood and vessel wall tissue. None of the previous IVUS segmentation algorithms used a statistical shape model based approach. Medical IVUS image segmentation algorithms are almost always hampered by noise, stents, shadowing due to calcium deposits and have weak or missing boundaries of structures. Under such conditions, prior models have proved to be useful in aiding the segmentation process. In fact, active shape models (ASMs) have become a popular tool in various segmentation applications for prostate, heart structures such as the left ventricle, and brain structures such as the corpus callosum. The first ASMs used parametric point distribution models learned through principal component analysis (PCA). The contours or shapes in a training dataset are first aligned to build an average shape, and eigenmodes or eigenshapes obtained through PCA describe the variations from the mean shape. Implicit shape representations are now more popular since they solve the correspondence problem between shapes during the alignment stage.

SUMMARY OF THE INVENTION

Exemplary embodiments of the invention as described herein generally include methods and systems for a model-based approach to segmentation of the arterial wall from both intravascular ultrasound images and optical coherence tomography images in the rectangular domain. Both the lumen and medial/adventitial contour variations are modeled within a shape space in the resampled rectangular domain. In a properly built shape space using training data, the lumen and media-adventitia contours are constrained to a smooth, closed geometry, which increases the segmentation quality without any tradeoff with a regularizer term, yet with adequate flexibility. In addition, a non-parametric intensity model based on a probability density based image energy is used with global image measurements rather than pointwise measurements used in previous methods. This enhances the segmentation results. Experiments demonstrate that a method according to an embodiment of the invention can be used in plaque analysis, 3D reconstruction of the arterial wall, and for measurements such as lumen size, lumen radius, wall radius, etc.

According to an aspect of the invention, there is provided a method for segmenting intravascular images, including acquiring a series of digitized images acquired from inside a vessel, each said image comprising a plurality of intensities corresponding to a 2-dimensional grid of pixels, providing a precomputed set of shapes for modeling contours of vessel wall boundaries, wherein a contour can be expressed as a sum of a mean shape and a inner product of shape modes and shape weights, initializing a boundary contour for one of said set of images initializing said shape weights by projecting a contour into said shape modes, updating said shape weights from differential equations of said shape weights, and computing a contour by summing said mean shape and said inner product of shape modes and updated shape weights.

According to a further aspect of the invention, the method comprises repeating said steps of updating said shape weights and computing a contour until said contour converges.

According to a further aspect of the invention, convergence of said contour occurs when and area enclosed by said contour begins to oscillate.

According to a further aspect of the invention, the shape weights are initialized according to $w^c = U_c^T(\Phi_{init}^c - \Phi_{mean}^c)$, wherein $w^c$ is a vector of shape weights, $\Phi_{init}^c$ is the initialized boundary contour, $\Phi_{mean}^c$ is the mean shape for the boundary, and $U_c^T$ is a matrix representing the shape modes.

According to a further aspect of the invention, the shape weights are updated according to $$w^c(t+1) = w^c(t) + \alpha \frac{\partial w^c}{\partial t}(t),$$

wherein $w^c(t+1)$ is the updated shape weight, $w^c(t)$ is a current shape weight, $$\frac{\partial w^c}{\partial t}(t)$$

is a gradient of the current shape weight, and $\alpha$ is a step size.

According to a further aspect of the invention, the contour is computed from said mean shape and said inner product of shape modes and updated shape weights according to $$\Phi^c(w) = \Phi_{mean}^c + \sum_{i=1}^{k} w_i^c(t+1) U_i^c,$$

wherein $w_i^c(t+1)$ is the $i^{th}$ component of the updated shape weight, $U_i^c$ is the $i^{th}$ component of the shape modes, $\Phi_{means}^c$ is the mean shape for the boundary, and $\Phi^c(w)$ is the contour.

According to a further aspect of the invention, the shape weights are updated according to $$w_i^c(t+1) = w_i^c(t) + \alpha \left[ \delta \frac{\partial w_i^c}{\partial t}(t-1) + (1-\delta) \frac{\partial w_i^c}{\partial t}(t) \right],$$

wherein $\delta$ is a weighting factor, and wherein $$\frac{\partial w_i^c}{\partial t}(t-1)$$

is a previous weight shape gradient.

According to a further aspect of the invention, the method comprises preprocessing the images to remove acquisition artifacts, including finding a minimum image $I_{min}$ of said series of images, computing sums over rows of $I_{min}$ until a global maxima is found, determining an artifact location as where a row sum falls below 50%, omitting rows above said artifact from said segmentation, wherein said artifact ends at a first local minimum after said global maximum.

According to a further aspect of the invention, the precomputed set of shapes are computed from the steps of acquiring a training set of digitized in-vivo intravascular images, forming a training set of boundary contour shapes from said training set of images, aligning said shapes in a radial direction and computing a mean shape of the set of shapes subtracting the mean shape from the set of training shapes to form a set of shape variability matrices, and determining a set of modes and weights wherein a shape model $\Phi$ is expressed as a sum of said mean shape and an inner product of the modes and weights according to $$\Phi(w) = \Phi_{mean} + \sum_{i=1}^{k} w_i U_i,$$

wherein $\Phi_{mean}$ is said mean shape, $w_i$ are the weights, and $U_i$ are the modes.

According to a further aspect of the invention, the images are acquired via ultrasound, wherein said boundary contour is a lumen contour, wherein said boundary contour is initialized by shifting said mean shape in an angular direction to minimize a mean image intensity above the contour, and wherein said gradient $$\frac{\partial w}{\partial t}$$

of said shape weight is calculated according to $$\frac{\partial w}{\partial t} = \int_C -\log\left(\frac{P_{in}(I(x))}{P_{out}(I(x))}\right) U^l dx,$$

wherein C is the contour, $I(x)$ is an image intensity at pixel x, $U^l$ is a lumen shape mode, and $P_{in}$ and $P_{out}$ are probability densities of an image point being, respectively, inside the contour and outside the contour.

According to a further aspect of the invention, the probability densities are estimated from a kernel density estimator $$P(q) = \frac{1}{N\sigma\sqrt{2\pi}} \sum_{i=1}^{N} \exp\left(\frac{(q-q_i)^2}{2\sigma^2}\right),$$

wherein N is a number of pixels inside or outside the contour, q is an intensity value inside or outside the contour, $\sigma$ is a corresponding variance, and $q_i$ is an individual intensity at pixel i.

According to a further aspect of the invention, the probability densities are functions of a modified intensity that is an averaged intensity over a column above a contour position $$x = (x, y): I_{modified}(x, y) = \max_{y_0 \in [0,y]} \frac{1}{y - y_0 + 1} \sum_{y_i = y_0}^{y} I(x, y_i),$$

wherein the origin of the image (0,0) is a top left corner of said image.

According to a further aspect of the invention, the boundary contour is initialized by dividing an image into a plurality of columns, finding a position of a maximal gradient for every column wherein a contour is initialized, and passing a median filter over the initial contour wherein noise is eliminated.

According to a further aspect of the invention, the gradient of said shape weight $$\frac{\partial w}{\partial t}$$

is calculated according to $$\frac{\partial w^a}{\partial t} = \int_C \nabla G(x) U^a dx,$$

wherein $U^a$ is a shape contour, and $\nabla G$ represents the smoothed oriented edge gradient taken as a difference between an average intensity of two oriented windows above and below said contour, $\nabla G(x) = G_{oriented}(x-\beta n) - G_{oriented}(x+\beta n)$, where $\beta$ is a scaling factor to determine the extent of said oriented boxes above and below said contour, and n is the normal vector to the contour at position x, and $$G_{oriented}(x) = \frac{1}{(2dx+1)dy}\left(\sum_{i=-dx}^{dx}\sum_{j=-dy}^{-1} I(x+iu+jn) - \sum_{i=-dx}^{dx}\sum_{j=1}^{dy} I(x+iu+jn)\right),$$

wherein 2dx+1 is the width and dy the height of said gradient window, x is a 2D image pixel, and u is the unit tangent vector to the contour at point x.

According to a further aspect of the invention, the boundary contour is one of a media/adventitia contour in an ultrasound image, or a lumen contour in an optical coherence tomography image.

According to another aspect of the invention, there is provided a method for segmenting intravascular images including the steps of acquiring a training set of digitized in-vivo intravascular images, each said image comprising a plurality of intensities corresponding to a 2-dimensional grid of pixels, forming a training set of boundary contour shapes from said training set of images, aligning said shapes in a radial direction and computing a mean shape of the set of shapes, subtracting the mean shape from the set of training shapes to form a set of shape variability matrices, determining a set of modes and weights wherein a shape model $\Phi$ is expressed as a sun of said mean shape and an inner product of the modes and weights according to $$\Phi(w) = \Phi_{mean} + \sum_{i=1}^{k} w_i U_i,$$

wherein $\Phi_{mean}$ is said mean shape, $w_i$ are the weights, and $U_i$ are the modes, providing a digitized in-vivo intravascular testing image, and segmenting a boundary contour in said testing image by using said shape model to initialize said boundary contour and to drive said segmentation.

According to a further aspect of the invention, segmenting said boundary contour includes initializing a first shape $\Phi_{init}$, initializing said weights w from $w = U^T(\Phi_{init} - \Phi_{mean})$, computing weight gradients $$\frac{\partial w}{\partial t}$$

and updating said weights according to $$w(t+1) = w(t) + \alpha \frac{\partial w}{\partial t}(t),$$

wherein t is an iteration step number and $\alpha$ is a step size, updating shapes from $$\Phi(w) = \Phi_{mean} + \sum_{i=1}^{k} w_i(t+1) U_i,$$

wherein the sum is over all k modes, and repeating said steps of computing weight gradients and updating weights until said shape contour converges.

According to a further aspect of the invention, the images are acquired via ultrasound and said boundary contour is a lumen, wherein said boundary contour is initialized by shifting said mean shape in an angular direction, and wherein said gradient $$\frac{\partial w}{\partial t}$$

of said shape weight is calculated according to $$\frac{\partial w}{\partial t} = \int_C -\log\left(\frac{P_{in}(I(x))}{P_{out}(I(x))}\right) U^l dx,$$

wherein C is the contour, I(x) is an image intensity at pixel x, $U^l$ is a lumen shape mode, wherein $P_{in}$ and $P_{out}$ are probability densities of an image point being, respectively, inside the contour and outside the contour, and said probability densities are estimated from $$P(q) = \frac{1}{N\sigma\sqrt{2\pi}} \sum_{i=1}^{N} \exp\left(\frac{(q-q_i)^2}{2\sigma^2}\right),$$

wherein N is a number of pixels inside or outside the contour, q is an intensity value inside or outside the contour, $\sigma$ is a corresponding variance, and $q_i$ is an individual intensity at pixel i.

According to a further aspect of the invention, the boundary contour is one of a media/adventitia contour in an ultrasound image, or a lumen contour in an optical coherence tomography image, wherein said boundary contour is initialized by finding a position of a maximal gradient for every image column, wherein said gradient of said shape weight $$\frac{\partial w}{\partial t}$$

is calculated according to $$\frac{\partial w^\beta}{\partial t} = \int_C \nabla G(x) U^\alpha dx,$$

wherein $U^\alpha$ is a shape contour, and $\nabla G$ represents the smoothed oriented edge gradient taken as a difference between an average intensity of two oriented windows above and below said contour, $\nabla G(x) = G_{oriented}(x-\beta n) - G_{oriented}(x+\beta n)$, where $\beta$ is a scaling factor to determine the extent of said oriented boxes above and below said contour, and n is the normal vector to the contour at position x, and $$G_{oriented}(x)\frac{1}{(2dx+1)dy}\left(\sum_{i=-dx}^{dx}\sum_{j=-dy}^{-1}I(x+iu+jn) - \sum_{i=-dx}^{dx}\sum_{j=1}^{dy}I(x+iu+jn)\right),$$

wherein 2dx+1 is the width and dy the height of said gradient window, x is a 2D image pixel, and u is the unit tangent vector to the contour at point x.

According to another aspect of the invention, there is provided a program storage device readable by a computer, tangibly embodying a program of instructions executable by the computer to perform the method steps for segmenting intravascular images.

BRIEF DESCRIPTION OF THE DRAWINGS

FIG. 1 illustrates an exemplary schema of an artery wall, according to an embodiment of the invention.

FIGS. 5*a-b* illustrate a nonlinear filtering effect on the intensity image, according to an embodiment of the invention.

FIGS. 7*a-f* depicts 6 examples of automatically computed lumen and media/adventitia contours, according to an embodiment of the invention.

DETAILED DESCRIPTION OF EXEMPLARY EMBODIMENTS

Figure 2A:
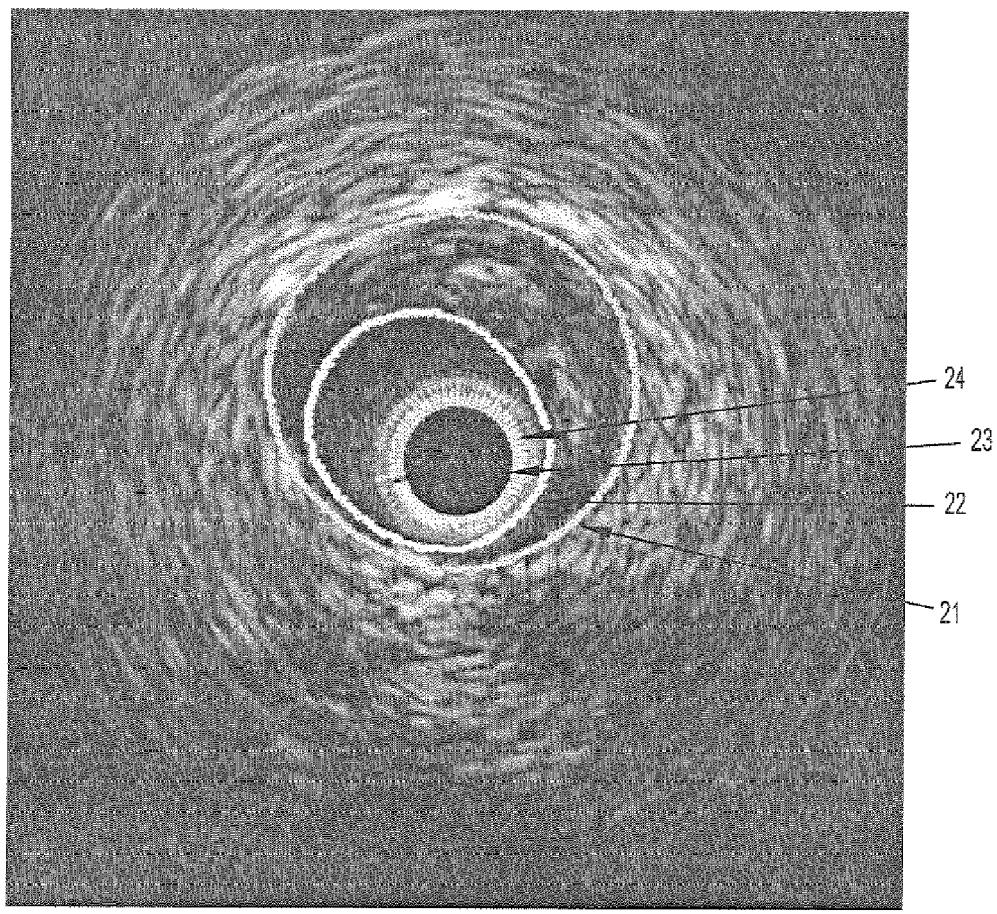
FIGS. 2*a-b* depicts exemplary lumen and medial/adventitial contours in both the display domain and the resampled rectangular domain, according to an embodiment of the invention.

Exemplary embodiments of the invention as described herein generally include systems and methods for segmentation of arterial wall boundaries from intravascular images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "Image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Representing and Building a Shape Space

Figure 2B:
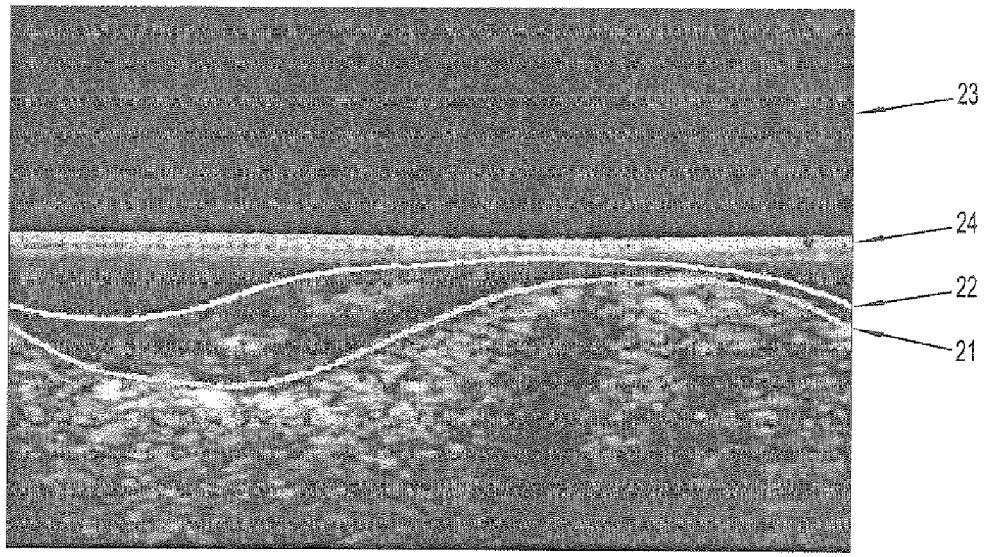

According to an embodiment of the invention, a statistical shape model is used to represent the inner and outer arterial wall contours in a compact way, and this shape prior is used to drive the segmentation. To build a statistical shape model, a shape representation is selected. FIGS. 2*a-b* depict typical lumen 22 and medial/adventitial 21 contours, along with the ring-down artifact 24 and the catheter dead zone 23, in both the display domain, FIG. 2*a*, and the resampled rectangular domain, FIG. 2*b*, which is the original acquisition format. According to an embodiment of the invention, the rectangular representation is used since computations are simpler due to the 1D appearance of the segmenting contours, as shown in FIG. 2*b*. Therefore, in the rectangular image domain $\Omega \in R^2$, an implicit shape representation is used by embedding periodic contours $C \in \Omega$ implicitly as the zero-level set of a signed distance function $\Phi: R^2 \to \Omega$:

$$C=\{(x,y)\in\Omega|\Phi(x,y)=0\}, \quad (1)$$

where $\Phi(x,y)<0$ is above (inside), and $\Phi(x,y)>0$ is below (outside) the contour.

As a first step in building a shape space, in-vivo pullbacks of 1529 frames on 20 patients were taken from the left anterior descending artery (LAD), the right coronary arthery (RCA), and the left circumflex coronary artery (LCX). 257 frames were used to train the shape space and 1272 frames were used for testing, the results of which are described in the Experiments section, below. The patients used for training were not included in the testing. The lumen and media/adventitia contours were segmented by an expert interventional cardiologist in our team, in order to provide the "ground truth" segmentation contours both for training and for testing.

After the signed distance representations for the N lumen shapes $\Phi_1^l, \ldots, \Phi_N^l$ and media/adventitia shapes $\Phi_1^a, \ldots, \Phi_N^a$ in the training dataset are formed, statistical analysis is performed. All shapes are aligned radially by cropping from the uppermost row (radial) coordinate where the contours can start to the lowermost row coordinate where the media/adventitia contours can end. The horizontal (angular) shift of the shape in the rectangular grid corresponds to a rotation of the shape in the display domain. No alignment was performed in the horizontal direction so the shape space can capture those shifts through its eigenshapes.

The mean lumen shape and the mean medial/adventitial shape can be computed as, respectively, $$\Phi_{mean}^l = \frac{1}{N}\sum_{i=1}^{N} \Phi_i^l,$$

$$\Phi_{mean}^a = \frac{1}{N}\sum_{i=1}^{N} \Phi_i^a.$$

Each of these quantities is subtracted from each shape in the training set to construct the shape variability matrices $S^l = [\tilde{\Phi}_1^l \ldots \tilde{\Phi}_N^l]$ and $S^a = [\tilde{\Phi}_1^a \ldots \tilde{\Phi}_N^a]$. After PCA is carried out on both $S^l$ and $S^a$ models are obtained that represent each shape as variations about the mean:

$$\Phi^l(w) = \Phi_{mean}^l + \sum_{i=1}^{k} w_i^l U_i^l, \quad (2)$$

$$\Phi^a(w) = \Phi_{mean}^a + \sum_{i=1}^{k} w_i^a U_i^a,$$

where $\Phi^l(w)$, $\Phi^a(w)$ represent arbitrary lumen and media/adventitial contours, $w^l = \{w_1^l, \ldots, w_k^l\}$ and $w^a = \{w_1^a, \ldots, w_k^a\}$ are the weights associated with the first k principal modes $U_i^l$ and $U_i^a$, respectively. These principle mode expansions are then tested on the testing set images.

Figure 10:
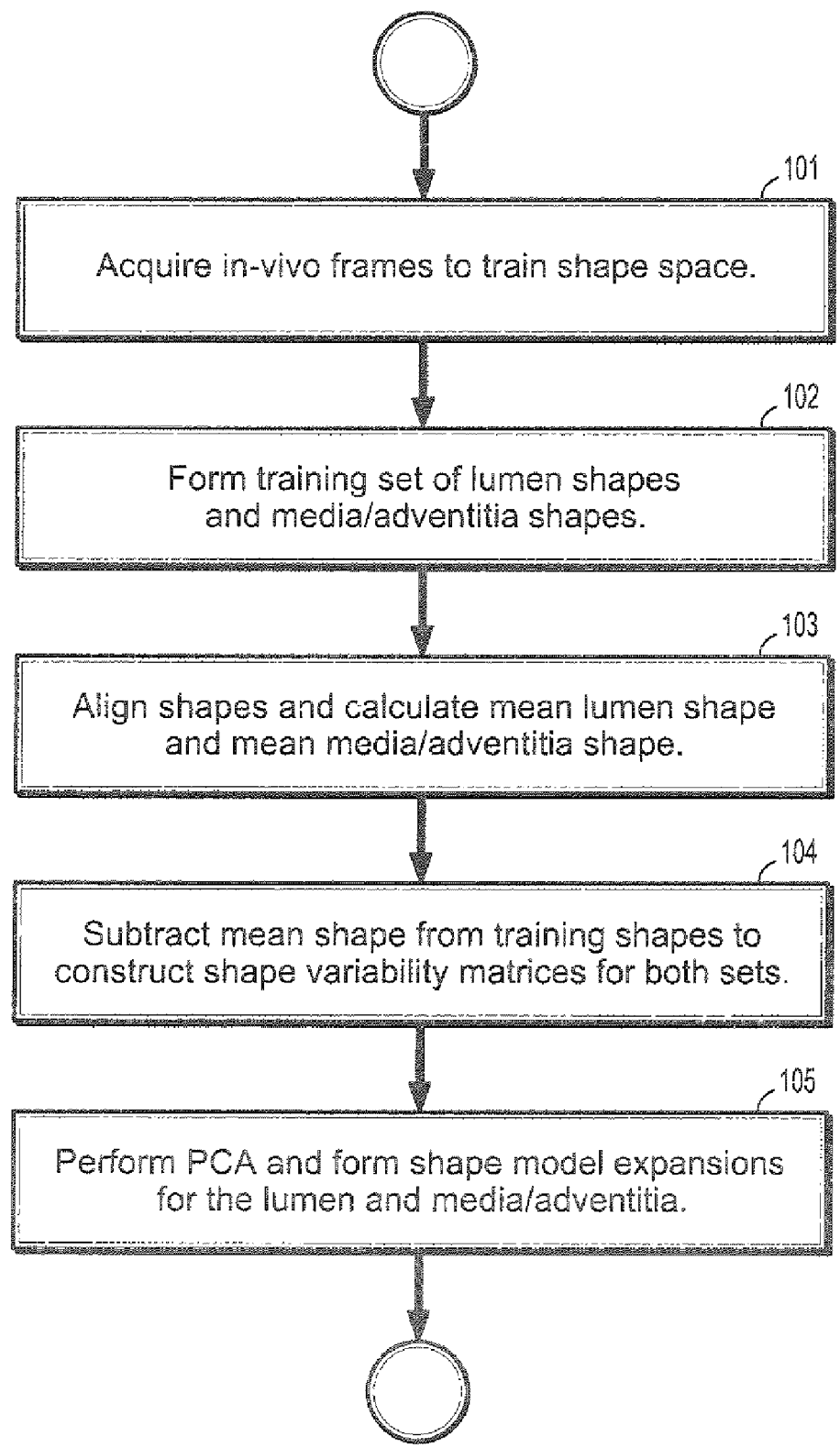
FIG. 10 is a flow chart of an algorithm for building a shape space for arterial segmentation, according to an embodiment of the invention

A flow chart summarizing an algorithm for building a shape space for arterial segmentation, according to an embodiment of the invention, is presented in FIG. 10. The algorithm begins at step 101 with the acquisition of the in-vivo image frames used to train and test the shape space. Note that these image frames can be acquired either by ultrasound (US) or by optical coherence tomography (OCT). The training sets for the lumen and media/adventitia contours are formed at step 102. At step 103, the shapes are radially aligned and the mean shape for the lumen and for the media/adventitia are calculated. At step 104, the respective mean shapes are subtracted from the training shapes to construct shape variability matrices. PCA is performed at step 105, after which shape model expansions are formed for the lumen and media/adventitia from the resulting, components.

Figure 3:
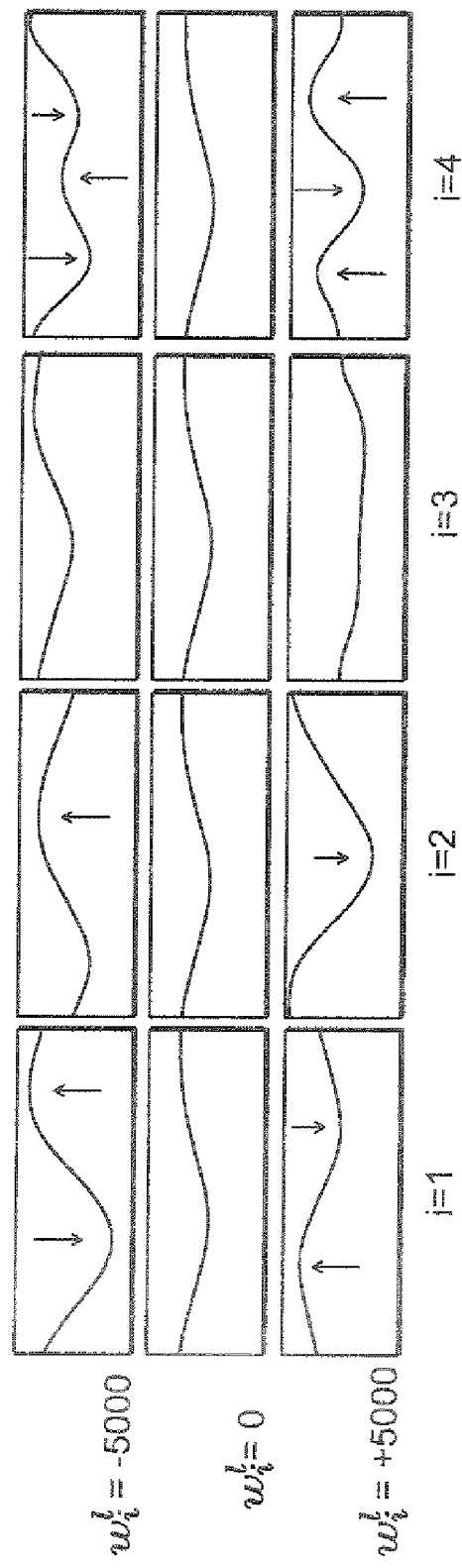
FIG. 3 depicts the eigenshapes representing the first four variations in the lumen shape space, according to an embodiment of the invention.

FIG. 3 depicts the eigenshapes representing the first four variations in the lumen shape space by varying them about the luminal mean shape, $\Phi_{mean}^l + w_i^l U_i^l$, with $i = \{1, 2, 3, 4\}$ from the left column to the right column. The arrows in the images emphasize the change directions for the contours as the weights are changed, that is, for each mode of variation, how the contours would change. The weights 0 and +−5000 indicated on the left hand side to label the rows are arbitrarily chosen to exaggerate the effects of mode variations for the purpose of illustration. However, for a given shape (e.g. luminal and media/adventitia contour) the weights would be computed from EQ. (3) below, and a weight value depends on the relative weighting of each mode in the shape expansion. Note that the first mode deformation corresponds to a negative/positive amplification of the curve, the second mode to a radial shift, i.e. the distance to the catheter and a change of the lumen area, although it also includes an angular shift effect. The third mode corresponds to a flattening vs. curving, whereas the fourth and higher modes contain more local variations of the shape. The same interpretations can be made for the eigenshapes of the media/adventitia contours. As can be seen from FIG. 3, the arterial wall contours form a fairly restricted class of shapes, therefore a small number of eigenshapes $\{U_i^l\}_{i=1}^{k}$ and $\{U_i^a\}_{i=1}^{k}$ can explain its variations. Experiments have indicated that six principal modes suffice for lumen and media/adventitia, respectively, to obtain shapes that are both meaningful and smooth.

Segmentation Framework

Once the statistical shape space is built, any arterial wall can be represented by a vector of weights $w_1^l, \ldots, w_k^l$ associated with the first k principal modes of the lumen data, and $w_1^a, \ldots, w_k^a$ of the media/adventitia data. The weights of any shape can be found using EQ. (2) by projecting the shape matrix without the mean onto the mode matrix:

$$w^l = U_l^T(\Phi^l - \Phi_{mean}^l),$$

$$w^a = U_a^T(\Phi^a - \Phi_{mean}^a), \quad (3)$$

where $\Phi^l$, $\Phi^a$ represent the truncated mode matrices in the reduced subspace, and the superscript T indicates a matrix transpose. With this compact shape description, the shape weights w can be directly evolved to deform the contour towards the lumen and media/adventitia borders in the IVUS image, as explained below.

Preprocessing

Figure 4:
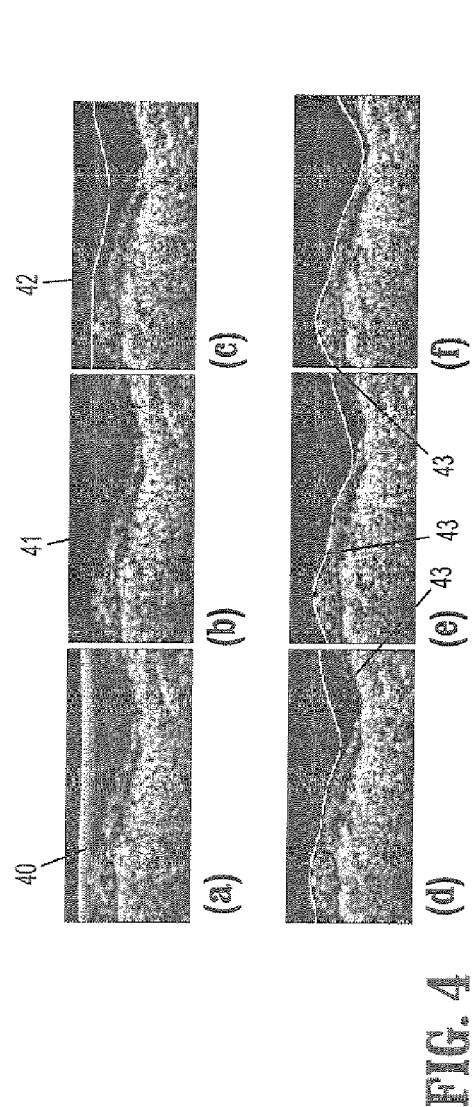
FIGS. 4*a-f* illustrate the rectangular domain before and after artifact removal, and the lumen segmentation evolution, according to an embodiment of the invention.

In IVUS images, the catheter creates a dead zone in the center of the display domain, corresponding to the top rows of the rectangular domain, alone with imaging artifacts due to "halo" ring-down effects of the catheter, as seen in FIGS. 2a-b. These regions may be removed because otherwise they will hamper the segmentation process. The standard approach, subtracting the average image from every frame, does not remove the artifact properly and degrades the image quality. However, the artifact stays approximately constant over the IVUS sequence of frames, but the variance of the artifact is not zero because the luminal border often interferes with the artifact zone. By taking the minimum image $I_{min}(x, y) = \min_{i \in \lambda} I_i(x, y)$ over a set of frames $I_i$ of an IVUS frame sequence $\lambda$, one can obtain a constant artifact zone without the bright interferences with the contour. Sums are computed over the rows of $I_{min}$ and the global maxima is found. The catheter artifact is noted as the row at which the row sum falls below 50%. Rows above this artifact line are omitted from computations involved in the segmentation. The first local minimum after the global maximum indicates the end of the artifact. The artifact zone of $I_{min}$ is subtracted from every frame. FIGS. 4a-b illustrate the rectangular domain before and after artifact removal, with the artifact zone 40 shown in FIG. 4*a*, and the remaining artifact line 41 shown in FIG. 4*b*.

Lumen Segmentation

The next step is to initialize the lumen contour in a way that takes advantage of the prior information about the lumen region having less ultrasound reflection, hence a darker intensity profile. This initialization can be accomplished by shifting the mean lumen shape $\Phi_{mean}^l$ in an angular direction to minimize the mean intensity above the contour. As shown in FIG. 4*c*, this simple strategy works well for the initial shape pose 41.

The luminal contour is constrained by the artifact line, as shown in FIG. 4*b*. The evolution of the shape weights, hence the segmentation, over the artificial evolution time t is depicted in FIGS. 4*c-f*, where FIG. 4*c* shows the initialization 42 of the luminal contour, and FIGS. 4*d-f* depicts evolution of the luminal contour 43 after 3, 6 and 9 iterations, respectively.

For the evolution of the luminal contour, region statistics from IVUS images are used for segmentation, and the following energy is defined:

$$E_{lumen}(w^l) = \int_\Omega -\chi_{in}(x) \log(P_{in}(I(x))) dx + \int_\Omega \chi_{out}(x) \log(P_{out}(I(x))) dx$$

where $\chi$ is an indicator function for inside and outside the contour. This energy is the familiar regional probabilistic energy. To estimate the probability distributions $P_{in}$ and $P_{out}$ a Kernel density estimator is used:

$$P(q) = \frac{1}{\sqrt{2\pi} N \sigma} \sum_{i=1}^{N} \exp\left(-\frac{(q-q_i)^2}{2\sigma^2}\right), \quad (4)$$

where N is the number of pixels inside or outside the contour, q is an intensity value in the intensity range of the image inside or outside the contour, $\sigma$ is a heuristically chosen variance. An exemplary, non-limiting value for the variance is a $\sigma = 10$.

Finally, the first variation of the energy in EQ. (4) is obtained to find the gradient flow of the contours represented by the weight vector w. The Euler-Lagrange equations result in the following differential equation for the flow:

$$\frac{\partial w}{\partial t} = \int_C -\log\left(\frac{P_{in}(I(x))}{P_{out}(I(x))}\right) U_i^l dx, \quad (5)$$

where $U_i^l$ is the eigenshape corresponding to the $i^{th}$ lumen contour weight $w_i^l$.

After the initial shape has been found, the following steps are iteratively repeated until convergence:

(1) Initialize the first shape $\Phi_{init}^l$.
(2) Compute the weights $w_i^l(t)$ at time t=0 from the shape, using EQ. (3).
(3) Update the weights using the shape gradients $$\frac{\partial w_i^l}{\partial t}$$

from EQ. (5):

$$w_i^l(t+1) = w_i^l(t) + \alpha \frac{\partial w_i^l}{\partial t}(t), \quad (6)$$

where the parameter $\alpha$ defines the step size.
(4) Compute the shape from the weights, using EQ. (2).
(5) Goto 3 until convergence.

A momentum term can be used to improve the speed of convergence for evolving the shape weights:

$$w_i^l(t+1) = w_i^l(t) + \alpha\left[\delta \frac{\partial w_i^l}{\partial t}(t-1) + (1-\delta)\frac{\partial w_i^l}{\partial t}(t)\right], \quad (7)$$

with $\delta = 0.2$ being an exemplary, non-limiting value.

The segmentation EQ. (5) above uses pointwise intensity measurements on the contour, which can be hampered by speckle noise in the lumen. A more global intensity term $I_{modified}$ can be designed that avoids the contour getting stuck in local minima. This intensity utilizes a maximum function of the averaged intensity over the column above the contour position x=(x, y):

$$I_{modified}(x, y) = \max_{y_0 \in [0,y]} \frac{1}{y - y_0 + 1} \sum_{y_i = y_0}^{y} I(x, y_i), \quad (8)$$

where the origin of the image (0,0) is in the top left corner. I(x) in EQ (5) is replaced with $I_{modified}(x)$. When the original intensity image is compared to the modified intensity image, as shown in FIGS. 5*a-b*, a nonlinear filtering effect can be observed on the intensity image that further enhances the lumen boundary. FIG. 5*a* depicts the original intensity image, while FIG. 5*b* depicts the modified intensity image.

The lumen segmentation usually converges after about 5 to 50 iterations. During the segmentation of the lumen, the energy oscillates due to speckle in the luminal area, therefore using the energy as the stopping criterion may cause the evolution to get stuck in local extrema. Instead, it is observed that as the contour starts oscillating, particularly in the rectangular grid, the contour starts to move up and down when it is close to convergence. This corresponds to an expanding and diminishing of the area that is enclosed by the segmented contour. Once the area size starts to oscillate, one knows convergence has been reached. Therefore, according to an exemplary, non-limiting embodiment of the invention, the algorithm is stopped after about 10 oscillations of the area size.

Media/Adventitia Segmentation

Statistical measurements around the media and adventitia border are unreliable because the intensity above and below the media/adventitia contour does not display particular regional patterns. Thus, it is useful to analyze local characteristics around the media/adventitia interface. In IVUS images, the media is observed as a thin black line, whereas the adventitia tissue has echogenic characteristics and appears very bright. This anatomical observation can be used to employ edge information. Gradient information can be used for the initialization as well as the shape evolution. However, a pointwise gradient is not very useful because of the noise present in IVUS images. To overcome these noise effects, a smoother version of the gradient can be defined as the difference between the average intensity of a box region above and below the current pixel position:

$$G_{smooth}(x, y) = \frac{1}{(2dx+1)dy}\left(\sum_{i=-dx}^{dx}\sum_{j=1}^{dy} I(x+i, y+j) - \sum_{i=-dx}^{dx}\sum_{j=-dy}^{-1} I(x+i, y+j)\right), \quad (9)$$

with 2dx+1 being the width and dy the height of the gradient window.

Figure 6:
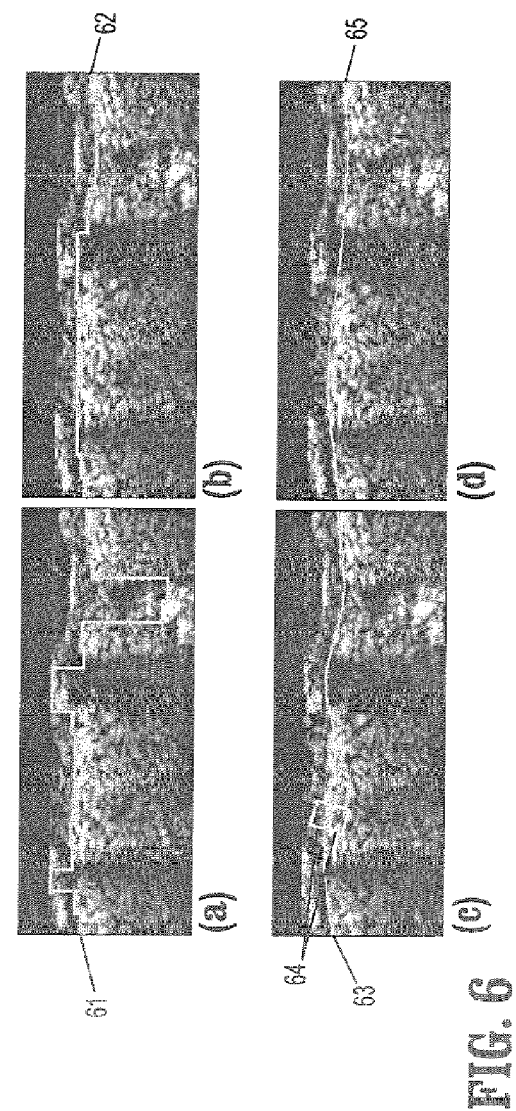
FIGS. 6*a-d* illustrate the segmentation of the media/adventitia, according to an embodiment of the invention.

FIGS. 6*a-d* illustrate the segmentation of the media/adventitia. FIG. 6*a* depicts the maximum intensities contour 61, FIG. 6*b* depicts the median filtered contour 62, FIG. 6*c* depicts the initial shape pose 63 with the gradient window 64, and FIG. 6*d* shows the evolved contour 65 after 6 iterations.

Since a gradient based energy is used for the shape evolution, a good initialization of the first shape pose is helpful. The following initialization technique according to an embodiment of the invention results in an initial shape pose that is already very close to the final media/adventitia contour. For the initialization of the media/adventitia contour, the rectangular image is divided into a plurality of columns. An exemplary, non-limiting number is 25 columns, corresponding to about 14.4 degree angular intervals. The position of maximal gradient is found for every column. This provides a first initialization of the media/adventitia contour 61, as shown in FIG. 6*a*. A median filter that is passed over this initial contour eliminates eventual noise due to small artifacts or openings resulting the filtered contour 62 shown in FIG. 6*b*. An exemplary, non-limiting median filter is of size of about 7. The median filtered contour is used as the initial shape pose 63, as shown in FIG. 6*c*, and results in a smooth contour.

The steps of initializing the weights, updating the weights, and computing the shape are the same as for the lumen, except as follows. For the evolution of the media/adventitia contour, a modified form of the edge-based energy is used:

$$E^a(w^a) = \int_C G(s)ds,$$

where s is a parameter along the contour C. The gradient is computed as the difference between the average intensity of two oriented windows 64 above and below the contour 63 as shown in FIG. 6*c*. The flow differential equation for the media/adventitia contour is derived as before, discarding the unnecessary curvature terms:

$$\frac{\partial w_i^a}{\partial t} = \int_C \nabla G(x) U_i^a dx, \quad (10)$$

with $\nabla G$ representing the smoothed oriented edge gradient $$\nabla G(x) = G_{oriented}(x-\beta n) - G_{oriented}(x+\beta n) \quad (11)$$

where β is a scaling factor to determine the extent (size) of the oriented boxes above and below the contour, and n is the normal vector to the contour at position x. Since the gradient is taken along the contour, the inclination of the gradient is known. Therefore, the gradient is taken as the difference between the average intensity of two oriented windows above and below the contour as shown in FIG. 6*c*:

$$G_{oriented}(x) = \frac{1}{(2dx+1)dy}\left(\sum_{i=-dx}^{dx}\sum_{j=-dy}^{-1} I(x+iu+jn) - \sum_{i=-dx}^{dx}\sum_{j=1}^{dy} I(x+iu+jn)\right), \quad (12)$$

where u is the unit tangent vector and n the unit normal vector to the contour at point x. Unlike the gradient of EQ. (9), which is aligned with the rectangular coordinate space, this gradient is aligned with the contour orientation at point x. In addition, an anatomical constraint can be incorporated to the evolution of the media/adventitia so that the minimum distance to the lumen is about 0.2 mm.

The media/adventitia segmentation stopping criteria is the same as that for lumen segmentation. According to an embodiment of the invention, the evolution is stopped after the area size of the media/adventitia oscillates more than about 10 times.

Inner Arterial Wall Segmentation in Optical Coherence Tomography Images

Optical coherence tomography (OCT) is an interferometric, non-invasive optical tomographic imaging technique offering millimeter penetration (approximately 2-3 mm in tissue) with micrometer-scale axial and lateral resolution. A shape-driven segmentation algorithm according to an embodiment of the invention can be applied to inner arterial wall extraction from OCT pullbacks as follows. OCT sequences frequently have higher image quality than the IVUS images, and thus require less preprocessing. Due to the imaging characteristics of the OCT sensor, the lumen has low reflection hence appears as a dark image region and the inner artery boundary appears as a bright image region with high reflection. As compared to IVUS images, OCT images have less speckle in the lumen and better contrast difference between lumen and the vessel, which suggests a gradient based approach rather than a region-based approach used for the lumen segmentation of the IVUS. In the shape space created before, similar to the EQ. (10), an update equation can be defined for the lumen contour shape weights:

$$\frac{\partial w_i^{Lo}}{\partial t} = \int_C \nabla G(x) U_i^{Lo} dx, \quad (13)$$

to capture the lumen boundary successfully.

Segmentation Summary

Figure 11:
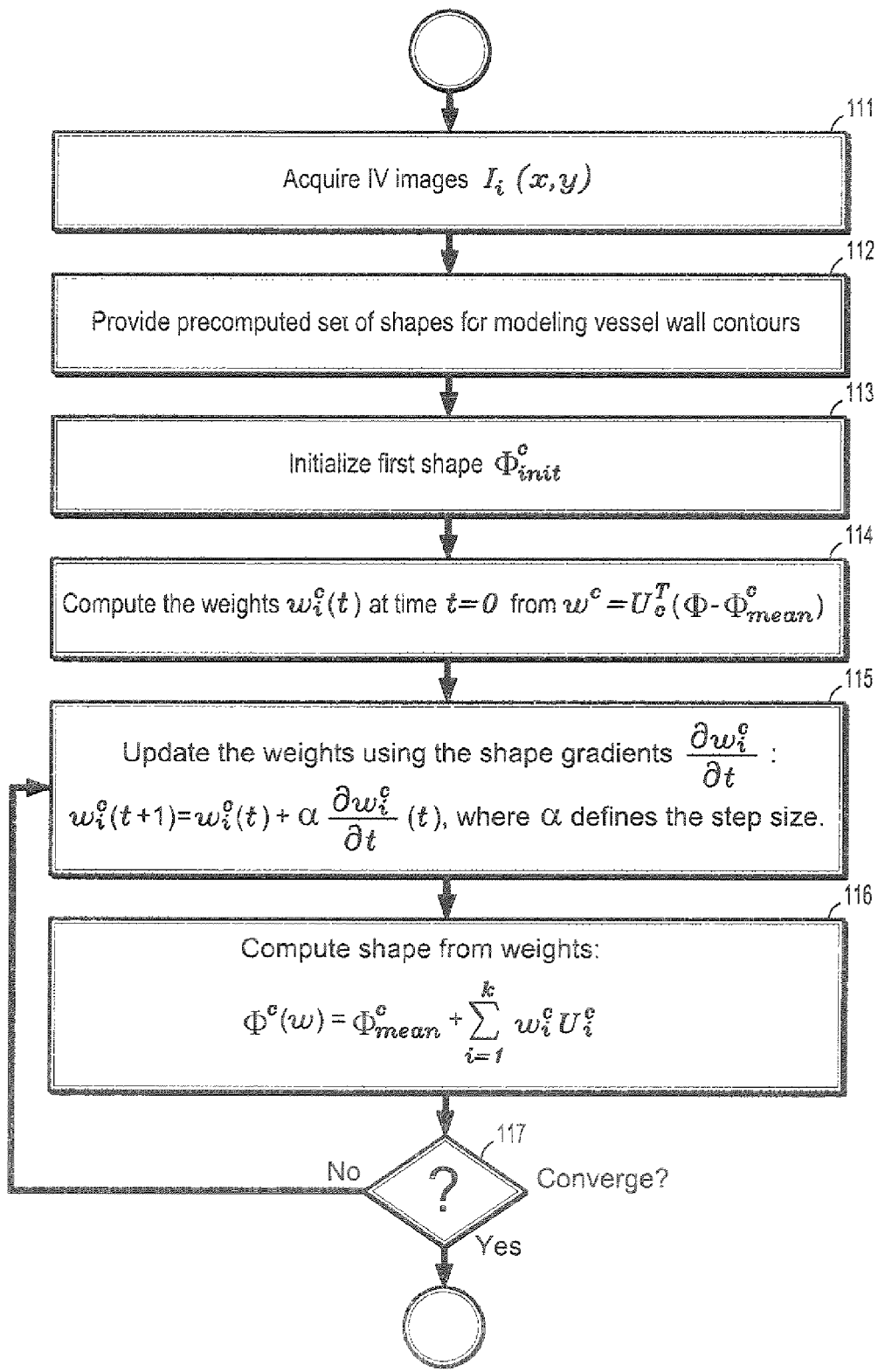
FIG. 11 is a flow chart of an algorithm for segmentation of arterial wall boundaries from intravascular images, according to an embodiment of the invention.

A flow chart that summarizes an algorithm according to an embodiment of the invention for segmenting arterial wall boundaries from intravascular images is presented in FIG. 11. An algorithm begins at step 111 with the acquisition of a sequence λ of IV images, either via US or OCT. The image sequence can be optionally preprocessed to remove the catheter artifact from every image. This involves finding a minimum image as described above, locating the artifact in the minimum image, and then subtracting the artifact from every sequence image. This step may not be needed for OCT images. A precomputed set of shapes for modeling contours of vessel wall boundaries is provided at step 112, where a contour can be expressed as a sum of a mean shape and a inner product of shape modes and shape weights. Exemplary shapes would be precomputed according to an algorithm such as that presented in FIG. 10, described above. At step 113, a first shape $\Phi_{init}^c$ is initialized. Here, the superscript c can represent either the lumen contour in the US or OCT image, or the media/adventitia contour in the US. For an IVUS lumen contour, the shape is initialized by shifting the mean shape in the angular direction minimize the mean intensity above the contour. For the other contours, a filtered maximal gradient is used, as described above. Initial weights $w_i^c(t)$ are computed at time t=0 from $w^c=U_c^T(\Phi_{init}^c-\Phi_{mean}^c)$ at step 114. At step 115 the weights are updated for each image using the using the shape gradients $$\frac{\partial w_i^c}{\partial t}: w_i^c(t+1) = w_i^c(t) + \alpha \frac{\partial w_i^c}{\partial t}(t),$$

where α defines the step size, and the subscript i indicates a weight vector component. For the IVUS lumen contour, the shape gradient $$\frac{\partial w_i^c}{\partial t}$$

is computed from EQ. (5). As described above, an optional modified intensity image can be used in calculating $P_{in}$ and $P_{out}$. For the IVUS media/adventitia contour or OCT lumen contour, the shape gradient $$\frac{\partial w_i^c}{\partial t}$$

is computed from EQ. (10). Furthermore, as described above, in all cases, an optional momentum term can be incorporated into the update expression. The shape is computed from the weights at step 116, using $$\Phi^c(w) = \Phi_{mean}^c + \sum_{i=1}^k w_i^c(t+1)U_i^c.$$

At step 117, convergence is tested according to the aforementioned stopping criteria. Steps 115, 116 and 117 are repeated until convergence is reached.

Experiments

An IVUS segmentation algorithm according to an embodiment of the invention was tested on 1272 images from IVUS pullbacks of 18 different patients. The update EQS. (5) and (10) are used to segment the lumen and media/adventitia contours and they typically converge after about 5 to 50 iterations.

FIGS. 7*a-f* depict 6 examples of automatically computed lumen 71 and media/adventitia 72 contours for several frames. For clarity, the lumen 71 and media/adventitia 72 contours are indicated only for FIG. 7*a*. FIG. 7*a* shows a healthy artery without plaque, FIG. 7*b* shows a centric catheter 73, FIG. 7*c* shows a small lumen with spurious noise 74 between lumen and media/adventitia, while FIGS. 7*d-f* show calcifications 75 with black shadow.

It was found that a media-adventitia algorithm according to an embodiment of the invention works well when there are no very strong features such as a large calcification or a large side branch opening. With minor calcification and side branches, the segmentation is fairly successful due to the nicely constrained shape space in which the segmentation occurs. Because of this, even if there are openings, noise or other artifacts, the contour stays as a closed smooth contour, and can achieve meaningful results.

Figures 7, 8:
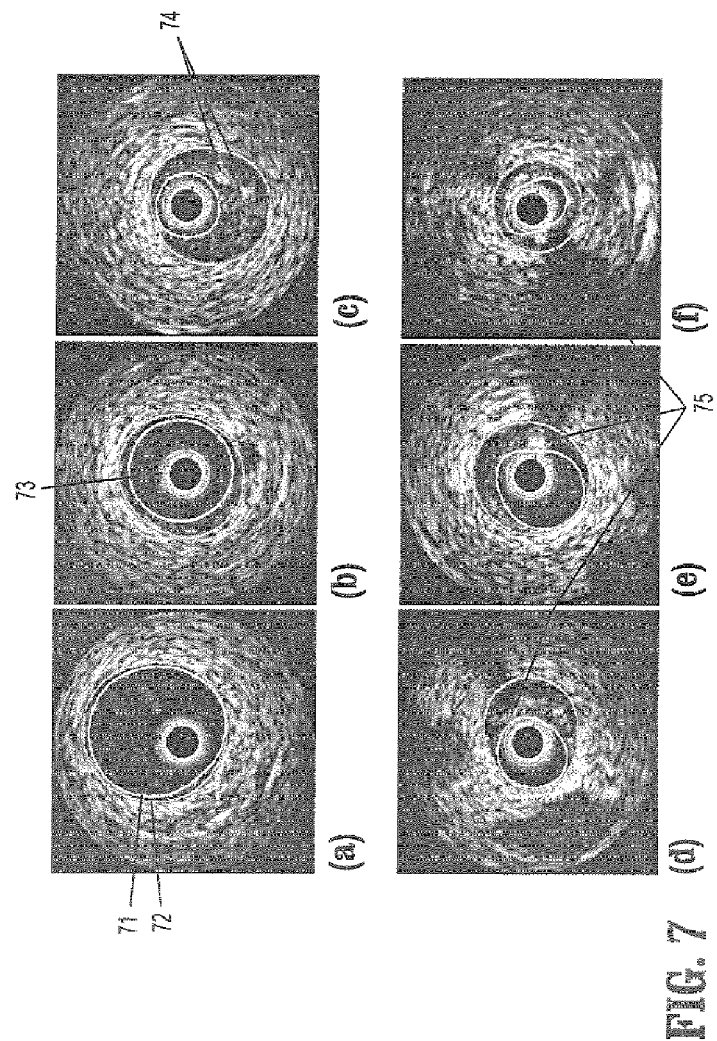
FIG. 8 is a table depicting the percentage of true positive pixels, false positive pixels, and absolute area differences of a segmentation algorithm according to an embodiment of the invention.

The table shown in FIG. 8 depicts the percentage of true positive pixels, false positive pixels, and absolute area differences between the segmentation maps of an algorithm according to an embodiment of the invention and the physician's manual delineations for both the lumen and the media/adventitia contours, averaged over 1272 IVUS frames. The pixel size is 25×25 µm². It can be observed that an algorithm according to an embodiment of the invention achieved a 96.99% correct classification for the lumen contour, and a 92.74% current classification for the media-adventitia contour.

With a 20 MHz IVUS probe, it can be observed that speckle noise is present in the lumen. However, a higher frequency probe (40 MHz) will produce more speckle noise. Therefore, the lumen segmentation is adopted by computing a new intensity probability distribution.

Figure 9:
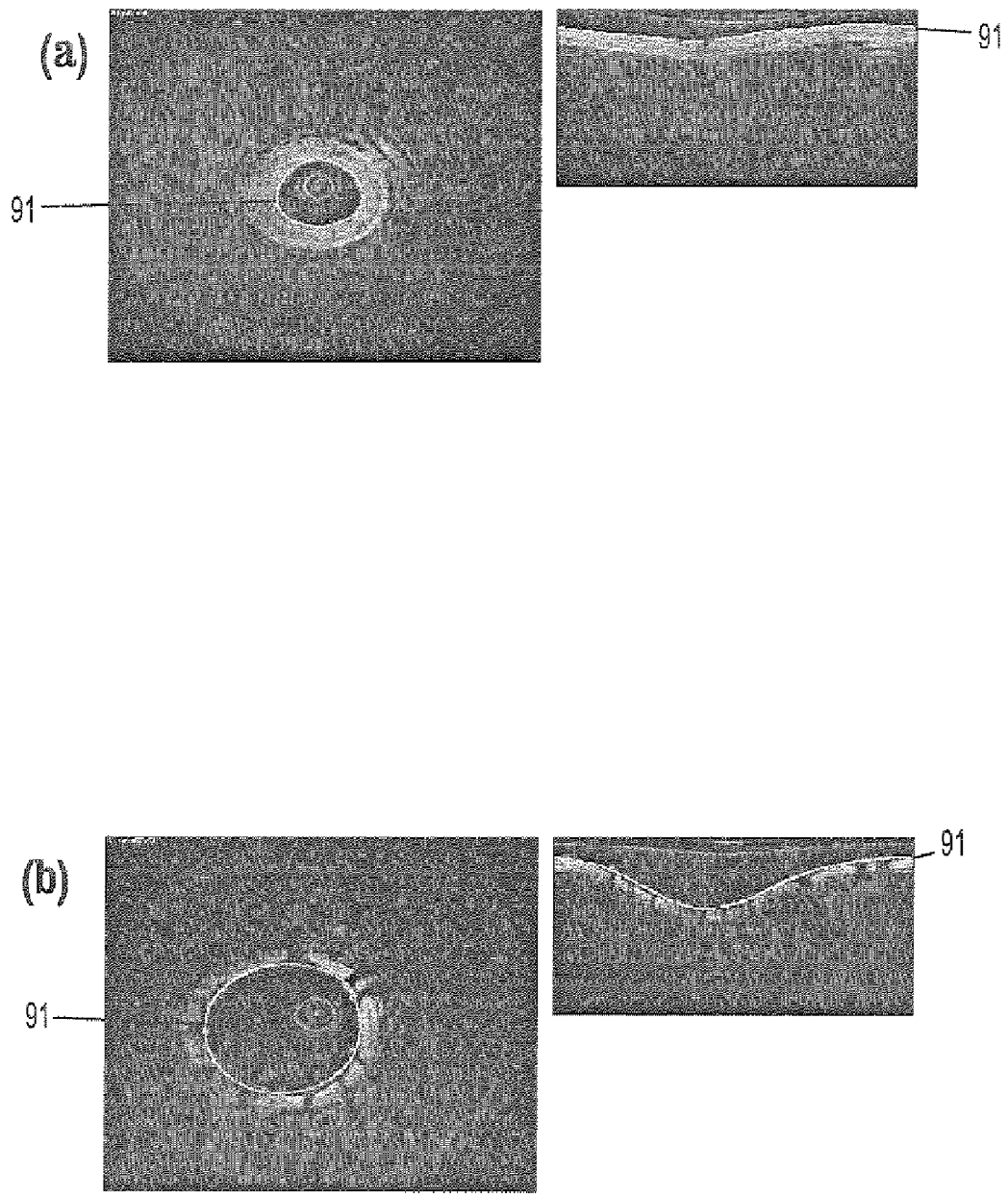
FIGS. 9*a-b* depicts examples of OCT lumen segmentation, according to an embodiment of the invention.

FIGS. 9*a-b* depict examples of automatically computed lumen contours 91 in intravascular OCT images. FIG. 9*a* depicts a lumen contour in an artery without a stent, and FIG. 9*b* depicts a lumen contour in an artery with a stent. The left column of images is in the display domain, and the right column of images is in the rectangular domain.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 12:
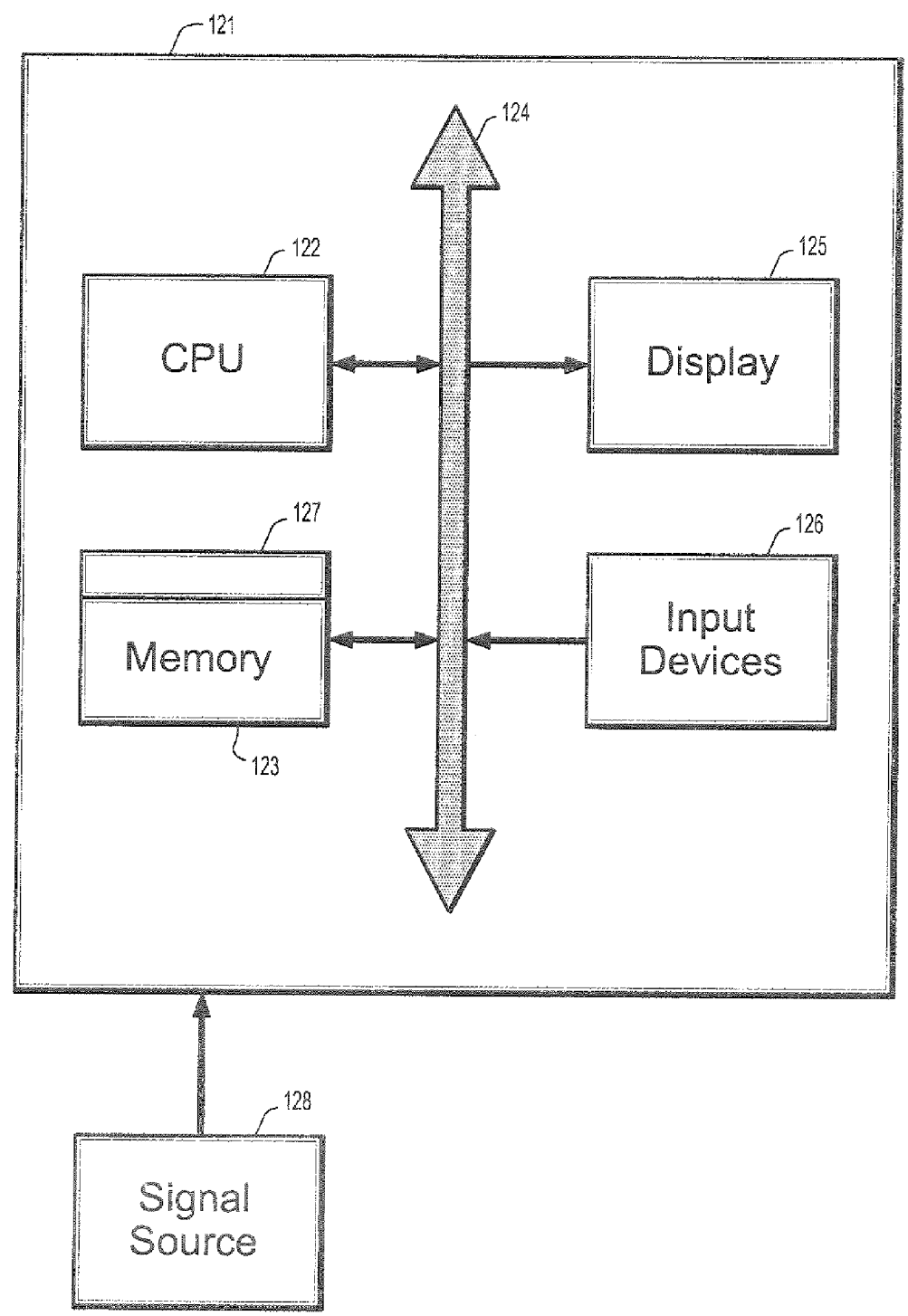
FIG. 12 is a block diagram of an exemplary computer system for implementing an algorithm for segmentation of arterial wall boundaries from intravascular images, according to an embodiment of the invention.

FIG. 12 is a block diagram of an exemplary computer system for implementing an algorithm for segmenting arterial wall boundaries from intravascular images, according to an embodiment of the invention. Referring now to FIG. 12, a computer system 121 for implementing the present invention can comprise, inter cilia, a central processing unit (CPU) 122, a memory 123 and an input/output (I/O) interface 124. The computer system 121 is generally coupled through the I/O interface 124 to a display 125 and various input devices 126 such as a mouse and a keyboard. The support circuits can include circuits such as cache, power supplies, clock circuits, and a communication bus. The memory 123 can include random access memory (RAM), read only memory (ROM), disk drive, tape drive, etc., or a combinations thereof. The present invention can be implemented as a routine 127 that is stored in memory 123 and executed by the CPU 122 to process the signal from the signal source 128. As such, the computer system 121 is a general purpose computer system that becomes a specific purpose computer system when executing the routine 127 of the present invention.

The computer system 121 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for segmenting intravascular images comprising the steps of:
    acquiring a series of digitized images acquired from inside a vessel, each said image comprising a plurality of intensities corresponding to a 2-dimensional grid of pixels;
    providing a precomputed set of shapes for modeling contours of vessel wall boundaries, wherein a contour can be expressed as a sum of a mean shape and a inner product of shape modes and shape weights;
    initializing a boundary contour for one of said set of images;
    initializing said shape weights by projecting a contour into said shape modes;
    updating said shape weights from differential equations of said shape weights; and
    computing a contour by summing said mean shape and said inner product of shape modes and updated shape weights.

2. The method of claim 1, further comprising repeating said steps of updating said shape weights and computing a contour until said contour converges.

3. The method of claim 2, wherein convergence of said contour occurs when and area enclosed by said contour begins to oscillate.

4. The method of claim 1, wherein said shape weights are initialized according to $w^c = U_c^T(\Phi_{init}^c - \Phi_{mean}^c)$, wherein $w^c$ is a vector of shape weights, $\Phi_{init}^c$ is the initialized boundary contour, $\Phi_{mean}^c$ is the mean shape for the boundary, and $U_c^T$ a matrix representing the shape modes.

5. The method of claim 1, wherein said shape weights are updated according to $$w^c(t+1) = w^c(t) + \alpha \frac{\partial w^c}{\partial t}(t),$$

wherein $w^c(t+1)$ is the updated shape weight, $w^c(t)$ is a current shape weight, $$\frac{\partial w^c}{\partial t}(t)$$

is a gradient of the current shape weight, and $\alpha$ is a step size.

6. The method of claim 5, wherein said shape weights are updated according to $$w_i^c(t+1) = w_i^c(t) + \alpha \left[ \frac{\partial w_i^c}{\partial t}(t-1) + (1-\delta) \frac{\partial w_i^c}{\partial t}(t) \right],$$

wherein $\delta$ is a weighting factor, and wherein $$\frac{\partial w_i^c}{\partial t}(t-1)$$

is a previous weight shape gradient.

7. The method of claim 1, wherein said contour is computed from said mean shape and said inner product of shape modes and updated shape weights according to $$\Phi^c(w) = \Phi_{mean}^c + \sum_{i=1}^{k} w_i^c(t+1) U_i^c,$$

wherein $w_i^c(t+1)$ is the $i^{th}$ component of the updated shape weight, $U_i^c$ is the $i^{th}$ component of the shape modes, $\Phi_{mean}^c$ is the mean shape for the boundary, and $\Phi^c(w)$ is the contour.

8. The method of claim 1, further comprising preprocessing the images to remove acquisition artifacts, including finding a minimum image $I_{min}$ of said series of images, computing sums over rows of $I_{min}$ until a global maxima is found, determining an artifact location as where a row sum falls below 50%, omitting rows above said artifact from said segmentation, wherein said artifact ends at a first local minimum after said global maximum.

9. The method of claim 1, wherein said precomputed set of shapes are computed from the steps of:
    acquiring a training set of digitized in-vivo intravascular images;
    forming a training set of boundary contour shapes from said training set of images;
    aligning said shapes in a radial direction and computing a mean shape of the set of shapes;
    subtracting the mean shape from the set of training shapes to form a set of shape variability matrices; and
    determining a set of modes and weights wherein a shape model $\Phi$ is expressed as a sum of said mean shape and an inner product of the modes and weights according to $$\Phi(w) = \Phi_{mean} + \sum_{i=1}^{k} w_i U_i,$$

wherein $\Phi_{mean}$ is said mean shape, $w_i$ are the weights, and $U_i$ are the modes.

10. The method of claim 1, wherein said images are acquired via ultrasound, wherein said boundary contour is a lumen contour, wherein said boundary contour is initialized by shifting said mean shape in an angular direction to minimize a mean image intensity above the contour, and wherein said gradient $$\frac{\partial w}{\partial t}$$

of said shape weight is calculated according to $$\frac{\partial w}{\partial t} = \int_C -\log\left(\frac{P_{in}(I(x))}{P_{out}(I(x))}\right) U^l dx,$$

wherein C is the contour, I(x) is an image intensity at pixel x, $U^l$ is a lumen shape mode, and $P_{in}$ and $P_{out}$ are probability densities of an image point being, respectively, inside the contour and outside the contour.

11. The method of claim 10, wherein said probability densities are estimated from a kernel density estimator $$P(q) = \frac{1}{N\sigma\sqrt{2\pi}} \sum_{i=1}^{N} \exp\left(\frac{(q-q_i)^2}{2\sigma^2}\right),$$

wherein N is a number of pixels inside or outside the contour, q is an intensity value inside or outside the contour, σ is a corresponding variance, and $q_i$ is an individual intensity at pixel i.

12. The method of claim 10, wherein said probability densities are functions of a modified intensity that is an averaged intensity over a column above a contour position x=(x, y):

$$I_{modified}(x, y) = \max_{y_0 \in [0,y]} \frac{1}{y - y_0 + 1} \sum_{y_i = y_0}^{y} I(x, y)$$

wherein the origin of the image (0,0) is a top left corner of said image.

13. The method of claim 1, wherein said boundary contour is initialized by dividing an image into a plurality of columns, finding a position of a maximal gradient for every column wherein a contour is initialized, and passing a median filter over the initial contour wherein noise is eliminated.

14. The method of claim 13, wherein said gradient of said shape weight $$\frac{\partial w}{\partial t}$$

is calculated according to $$\frac{\partial w^e}{\partial t} = \int_C \nabla G(x) U^a dx,$$

wherein $U^a$ is a shape contour, and $\nabla G$ represents the smoothed oriented edge gradient taken as a difference between an average intensity of two oriented windows above and below said contour, $$\nabla G(x) = G_{oriented}(x - \beta n) - G_{oriented}(x \beta n)$$

wherein β is a scaling factor to determine the extent of said oriented boxes above and below said contour, and n is the normal vector to the contour at position x, and $$G_{oriented}(x) = \frac{1}{(2dx+1)dy}\left(\sum_{i=-dx}^{dx}\sum_{j=-dy}^{-1} I(x+iu+jn) - \sum_{i=-dx}^{dx}\sum_{j=1}^{dy} I(x+iu+jn)\right),$$

wherein 2dx+1 is the width and dy the height of said gradient window, x is a 2D image pixel, and u is the unit tangent vector to the contour at point x.

15. The method of claim 14, wherein said boundary contour is one of a media/adventitia contour in an ultrasound image, or a lumen contour in an optical coherence tomography image.

16. A method for segmenting intravascular images comprising the steps of:
    acquiring a training set of digitized in-vivo intravascular images, each said image comprising a plurality of intensities corresponding to a 2-dimensional grid of pixels;
    forming a training set of boundary contour shapes from said training set of images;
    aligning said shapes in a radial direction and computing a mean shape of the set of shapes;
    subtracting the mean shape from the set of training shapes to form a set of shape variability matrices;
    determining a set of modes and weights wherein a shape model Φ is expressed as a sum of said mean shape and an inner product of the modes and weights according to $$\Phi(w) = \Phi_{mean} + \sum_{i=1}^{k} w_i U_i,$$

wherein $\Phi_{mean}$ is said mean shape, $w_i$ are the weights, and $U_i$ are the modes;
    providing a digitized in-vivo intravascular testing image; and
    segmenting a boundary contour in said testing image by using said shape model to initialize said boundary contour and to drive said segmentation.

17. The method of claim 16, wherein segmenting said boundary contour comprises the steps of:
    initializing a first shape $\Phi_{init}$;
    initializing said weights w from $w = U^T(\Phi_{init} - \Phi_{mean})$,
    computing weight gradients $$\frac{\partial w}{\partial t}$$

and updating said weights according to $$w(t+1) = w(t) + \alpha \frac{\partial w}{\partial t}(t),$$

wherein t is an iteration step number and α is a step size; updating shapes from $$\Phi(w) = \Phi_{mean} + \sum_{i=1}^{k} w_i(t+1)U_i,$$

wherein the sum is over all k modes; and
repeating said steps of computing weight gradients and updating weights until said shape contour converges.

18. The method of claim 17, wherein said images are acquired via ultrasound and said boundary contour is a lumen, wherein said boundary contour is initialized by shifting said mean shape in an angular direction, and wherein said gradient $$\frac{\partial w}{\partial t}$$

of said shape weight is calculated according to $$\frac{\partial w}{\partial t} = \int_C -\log\left(\frac{P_{in}(I(x))}{P_{out}(I(x))}\right)U^l dx,$$

wherein C is the contour, I(x) is an image intensity at pixel x, $U^l$ is a lumen shape mode, wherein $P_{in}$ and $P_{out}$ are probability densities of an image point being, respectively, inside the contour and outside the contour, and said probability densities are estimated from $$P(q) = \frac{1}{N\sigma\sqrt{2\pi}} \sum_{i=1}^{N} \exp\left(\frac{(q-q_i)^2}{2\sigma^2}\right),$$

wherein N is a number of pixels inside or outside the contour, q is an intensity value inside or outside the contour, σ is a corresponding variance, and $q_i$ is an individual intensity at pixel i.

19. The method of claim 17, wherein said boundary contour is one of a media/adventitia contour in an ultrasound image, or a lumen contour in an optical coherence tomography image, wherein said boundary contour is initialized by finding a position of a maximal gradient for every image column, wherein said gradient of said shape weight $$\frac{\partial w}{\partial t}$$

is calculated according to $$\frac{\partial w^a}{\partial t} = \int_C \nabla G(x) U^a dx,$$

wherein $U^a$ is a shape contour, and ∇G represents the smoothed oriented edge gradient taken as a difference between an average intensity of two oriented windows above and below said contour, $$\nabla G(x) = G_{oriented}(x-\beta n) - G_{oriented}(x+\beta n)$$

where β is a scaling factor to determine the extent of said oriented boxes above and below said contour, and n is the normal vector to the contour at position x, and $$G_{oriented}(x) = \frac{1}{(2dx+1)dy}\left(\sum_{i=-dx}^{dx}\sum_{j=-dy}^{-1} I(x+iu+jn) - \sum_{i=-dx}^{dx}\sum_{j=1}^{dy} I(x+iu+jn)\right),$$

wherein 2dx+1 is the width and dy the height of said gradient window, x is a 2D image pixel, and u is the unit tangent vector to the contour at point x.

20. A program storage device readable by a computer, tangibly embodying a program of instructions executable by the computer to perform the method steps for segmenting intravascular images, the method comprising the steps of:
acquiring a series of digitized images acquired from inside a vessel, each said image comprising a plurality of intensities corresponding to a 2-dimensional grid of pixels;
providing a precomputed set of shapes for modeling contours of vessel wall boundaries, wherein a contour can be expressed as a sum of a mean shape and a inner product of shape modes and shape weights;
initializing a boundary contour for one of said set of images;
initializing said shape weights by projecting a contour into said shape modes;
updating said shape weights from differential equations of said shape weights; and
computing a contour by summing said mean shape and said inner product of shape modes and updated shape weights.

21. The computer readable program storage device of claim 20, the method further comprising repeating said steps of updating said shape weights and computing a contour until said contour converges.

22. The computer readable program storage device of claim 21, wherein convergence of said contour occurs when and area enclosed by said contour begins to oscillate.

23. The computer readable program storage device of claim 20, wherein said shape weights are initialized according to $w^c = U_c^T(\Phi_{init}^c - \Phi_{mean}^c)$, wherein $w^c$ is a vector of shape weights, $\Phi_{init}^c$ is the initialized boundary contour, $\Phi_{mean}^c$ is the mean shape for the boundary, and $U_c^T$ is a matrix representing the shape modes.

24. The computer readable program storage device of claim 20, wherein said shape weights are updated according to $$w^c(t+1) = w^c(t) + \alpha\frac{\partial w^c}{\partial t}(t),$$

wherein $w^c(t+1)$ is the updated shape weight, $w^c(t)$ is a current shape weight, $$\frac{\partial w^c}{\partial t}(t)$$

is a gradient of the current shape weight, and α is a step size.

25. The computer readable program storage device of claim 24, wherein said shape weights are updated according to $$w_i^a(t+1) = w_i^c(t) + \alpha\left[\delta\frac{\partial w_i^c}{\partial t}(t-1) + (1-\delta)\frac{\partial w_i^c}{\partial t}(t)\right],$$

wherein δ is a weighting factor, and wherein $$\frac{\partial w_i^c}{\partial t}(t-1)$$

is a previous weight shape gradient.

26. The computer readable program storage device of claim 20, wherein said contour is computed from said mean shape and said inner product of shape modes and updated shape weights according to $$\Phi^c(w) = \Phi_{mean}^c + \sum_{i=1}^{k} w_i^c(t+1)U_i^a,$$

wherein $w_i^c(t+1)$ is the $i^{th}$ component of the updated shape weight, $U_i^c$ is the $i^{th}$ component of the shape modes, $\Phi_{mean}^c$ is the mean shape for the boundary, and $\Phi^c(W)$ is the contour.

27. The computer readable program storage device of claim 20, the method further comprising preprocessing the images to remove acquisition artifacts, including finding a minimum image $I_{min}$ of said series of images, computing sums over rows of $I_{min}$ until a global maxima is found, determining an artifact location as where a row sum falls below 50%, omitting rows above said artifact from said segmentation, wherein said artifact ends at a first local minimum after said global maximum.

28. The computer readable program storage device of claim 20, wherein said precomputed set of shapes are computed from the steps of:
   acquiring a training set of digitized in-vivo intravascular images;
   forming a training set of boundary contour shapes from said training set of images;
   aligning said shapes in a radial direction and computing a mean shape of the set of shapes;
   subtracting the mean shape from the set of training shapes to form a set of shape variability matrices; and
   determining a set of modes and weights wherein a shape model Φ is expressed as a sum of said mean shape and an inner product of the modes and weights according to $$\Phi(w) = \Phi_{mean} + \sum_{i=1}^{k} w_i U_i,$$

wherein $\Phi_{mean}$ is said mean shape, $w_i$ are the weights, and $U_i$ are the modes.

29. The computer readable program storage device of claim 20, wherein said images are acquired via ultrasound, wherein said boundary contour is a lumen contour, wherein said boundary contour is initialized by shifting said mean shape in an angular direction to minimize a mean image intensity above the contour, and wherein said gradient $$\frac{\partial w}{\partial t}$$

of said shape weight is calculated according to $$\frac{\partial w}{\partial t} = \int_C -\log\left(\frac{P_{in}(I(x))}{P_{out}(I(x))}\right)U^l dx,$$

wherein C is the contour, I(x) is an image intensity at pixel x, $U^l$ is a lumen shape mode, and $P_{in}$ and $P_{out}$ are probability densities of an image point being, respectively, inside the contour and outside the contour.

30. The computer readable program storage device of claim 29, wherein said probability densities are estimated from a kernel density estimator $$P(q) = \frac{1}{N\sigma\sqrt{2\pi}} \sum_{i=1}^{N} \exp\left(\frac{(q-q_i)^2}{2\sigma^2}\right),$$

wherein N is a number of pixels inside or outside the contour, q is an intensity value inside or outside the contour, σ is a corresponding variance, and $q_i$ is an individual intensity at pixel i.

31. The computer readable program storage device of claim 29, wherein said probability densities are functions of a modified intensity that is an averaged intensity over a column above a contour position x=(x, y):

$$I_{modified}(x, y) = \max_{y_0 \in [0,y]} \frac{1}{y - y_0 + 1} \sum_{y_i = y_0}^{y} I(x, y_i),$$

wherein the origin of the image (0,0) is a top left corner of said image.

32. The computer readable program storage device of claim 20, wherein said boundary contour is initialized by dividing an image into a plurality of columns, finding a position of a maximal gradient for every column wherein a contour is initialized, and passing a median filter over the initial contour wherein noise is eliminated.

33. The computer readable program storage device of claim 32, wherein said gradient of said shape weight $$\frac{\partial w}{\partial t}$$

is calculated according to $$\frac{\partial w^a}{\partial t} = \int_C \nabla G(x)U^a dx,$$

wherein $U^a$ is a shape contour, and ∇G represents the smoothed oriented edge gradient taken as a difference between an average intensity of two oriented windows above and below said contour, $$\nabla G(x) = G_{oriented}(x - \beta n) - G_{oriented}(x + \beta n)$$

where β is a scaling factor to determine the extent of said oriented boxes above and below said contour, and n is the normal vector to the contour at position x, and $$G_{oriented}(x) = \frac{1}{(2dx+1)dy}\left(\sum_{i=-dx}^{dx}\sum_{j=-dy}^{-1} I(x+iu+jn) - \sum_{i=-dx}^{dx}\sum_{j=1}^{dy} I(x+iu+jn)\right),$$

wherein 2dx+1 is the width and dy the height of said gradient window, x is a 2D image pixel, and u is the unit tangent vector to the contour at point x.

34. The computer readable program storage device of claim 33, wherein said boundary contour is one of a media/adventitia contour in an ultrasound image, or a lumen contour in an optical coherence tomography image.

* * * * *